US012626413B2

(12) United States Patent
Joshi et al.

(10) Patent No.: US 12,626,413 B2
(45) Date of Patent: May 12, 2026

(54) CODING OF DISPLACEMENTS USING HIERARCHICAL CODING AT SUBDIVISION LEVEL FOR VERTEX MESH (V-MESH)

(71) Applicant: Samsung Electronics Co., Ltd., Suwon-si (KR)

(72) Inventors: Rajan Laxman Joshi, San Diego, CA (US); Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 183 days.

(21) Appl. No.: 18/486,784

(22) Filed: Oct. 13, 2023

(65) Prior Publication Data

US 2024/0185469 A1      Jun. 6, 2024

Related U.S. Application Data

(60) Provisional application No. 63/417,602, filed on Oct. 19, 2022.

(51) Int. Cl.
| | |
|---|---|
| *G06T 9/00* | (2006.01) |
| *H04N 19/119* | (2014.01) |
| *H04N 19/172* | (2014.01) |
| *H04N 19/184* | (2014.01) |
| *H04N 19/597* | (2014.01) |

(52) U.S. Cl.
CPC ........... *G06T 9/001* (2013.01); *H04N 19/119* (2014.11); *H04N 19/172* (2014.11); *H04N 19/184* (2014.11); *H04N 19/597* (2014.11)

(58) Field of Classification Search
CPC .. H04N 19/119; H04N 19/172; H04N 19/184; H04N 19/597
See application file for complete search history.

(56) References Cited

U.S. PATENT DOCUMENTS

| | | | | |
|---|---|---|---|---|
| 2023/0290063 | A1* | 9/2023 | Mammou | G06T 17/20 |
| 2024/0022766 | A1* | 1/2024 | Ahn | G06T 7/20 |
| 2024/0137564 | A1* | 4/2024 | Huang | H04N 19/146 |
| 2025/0150617 | A1* | 5/2025 | Xu | H04N 19/521 |

FOREIGN PATENT DOCUMENTS

| | | | | |
|---|---|---|---|---|
| JP | 2024008745 A | * | 1/2024 | H04N 19/184 |

OTHER PUBLICATIONS

"V-Mesh Test Model v1," WG 7, MPEG 3D Graphics and Haptics Coding, ISO/IEC JTC 1/SC 29/WG 7 N00404, Jul. 2022, 15 pages.
"WD 2.0 of V-DMC," MPEG 3D Graphics and Haptics Coding, ISO/IEC JTC 1/SC 29/WG 7 N00546, Jan. 2023, 76 pages.
"WD 3.0 of V-DMC," MPEG 3D Graphics and Haptics Coding, ISO/IEC JTC 1/SC 29/WG 07 N00611, Apr. 2023, 142 pages.
"WD 4.0 of V-DMC," MPEG 3D Graphics and Haptics Coding, ISO/IEC JTC 1/SC 29/WG 07 N00611, Aug. 2023, 145 pages.

* cited by examiner

*Primary Examiner* — Alicia M Harrington
*Assistant Examiner* — Brianna Renae Cochran

(57) ABSTRACT

An apparatus includes a communication interface and a processor operably coupled to the communication interface. The processor is configured to subdivide an intermediate mesh-frame, created from a reconstructed first displacement field and a first subdivided mesh-frame, to create a second subdivided mesh-frame. The processor is also configured to generate a second displacement field based on the second subdivided mesh-frame and an original mesh-frame. The processor is further configured to encode the second displacement field into a bitstream.

14 Claims, 8 Drawing Sheets

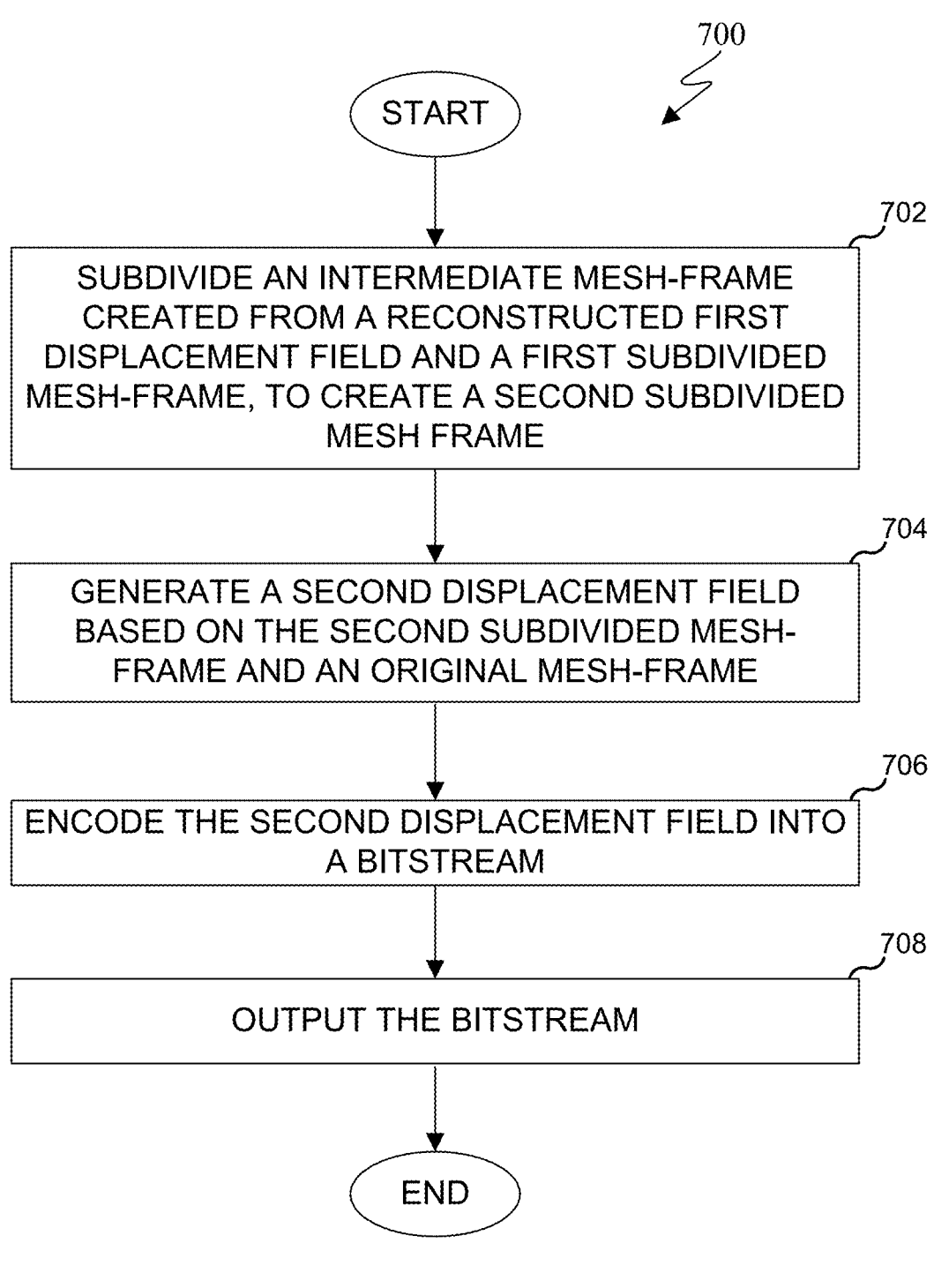

700

START

702

SUBDIVIDE AN INTERMEDIATE MESH-FRAME CREATED FROM A RECONSTRUCTED FIRST DISPLACEMENT FIELD AND A FIRST SUBDIVIDED MESH-FRAME, TO CREATE A SECOND SUBDIVIDED MESH FRAME

704

GENERATE A SECOND DISPLACEMENT FIELD BASED ON THE SECOND SUBDIVIDED MESH-FRAME AND AN ORIGINAL MESH-FRAME

706

ENCODE THE SECOND DISPLACEMENT FIELD INTO A BITSTREAM

708

OUTPUT THE BITSTREAM

END

FIG. 7

CODING OF DISPLACEMENTS USING HIERARCHICAL CODING AT SUBDIVISION LEVEL FOR VERTEX MESH (V-MESH)

CROSS-REFERENCE TO RELATED APPLICATION AND PRIORITY CLAIM

This application claims priority under 35 U.S.C. § 119(e) to U.S. Provisional Patent Application No. 63/417,602 filed on Oct. 19, 2022, which is hereby incorporated by reference in its entirety.

TECHNICAL FIELD

This disclosure relates generally to multimedia devices and processes. More specifically, this disclosure relates to improved coding of displacements using hierarchical coding at the subdivision level for vertex mesh (V-MESH).

BACKGROUND

Three hundred sixty degree (360°) video and three dimensional (3D) volumetric video are emerging as new ways of experiencing immersive content due to the ready availability of powerful handheld devices such as smartphones. While 360° video enables an immersive "real life," "being-there," experience for consumers by capturing the 360° outside-in view of the world, 3D volumetric video can provide a complete six degrees of freedom (DoF) experience of being immersed and moving within the content. Users can interactively change their viewpoint and dynamically view any part of the captured scene or object they desire. Display and navigation sensors can track head movement of a user in real-time to determine the region of the 360° video or volumetric content that the user wants to view or interact with. Multimedia data that is 3D in nature, such as point clouds or 3D polygonal meshes, can be used in the immersive environment.

SUMMARY

This disclosure provides improved coding of displacements using hierarchical coding at the subdivision level for V-MESH.

In a first embodiment, an apparatus includes a communication interface and a processor operably coupled to the communication interface The processor is configured to subdivide an intermediate mesh-frame, created from a reconstructed first displacement field and a first subdivided mesh-frame, to create a second subdivided mesh-frame. The processor is also configured to generate a second displacement field based on the second subdivided mesh-frame and an original mesh-frame. The processor is also configured to encode the second displacement field into a bitstream.

In a second embodiment, a method includes subdividing an intermediate mesh-frame, created from a reconstructed first displacement field and a first subdivided mesh-frame, to create a second subdivided mesh-frame. The method also includes generating a second displacement field based on the second subdivided mesh-frame and an original mesh-frame. The method also includes encoding the second displacement field into a bitstream.

In a third embodiment, an apparatus includes a communication interface and a processor operably coupled to the communication interface. The processor is configured to receive a compressed bitstream of a plurality of displacement fields. The processor is also configured to decode the compressed bitstream and reconstruct the plurality of displacement fields. The processor is also configured to combine each one of the reconstructed plurality of displacement fields with one of a plurality of subdivided mesh-frames to reconstruct a mesh-frame.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates an example encoding method for improved coding of displacements using hierarchical coding at the subdivision level for V-MESH in accordance with this disclosure.

DETAILED DESCRIPTION

Figure 1:
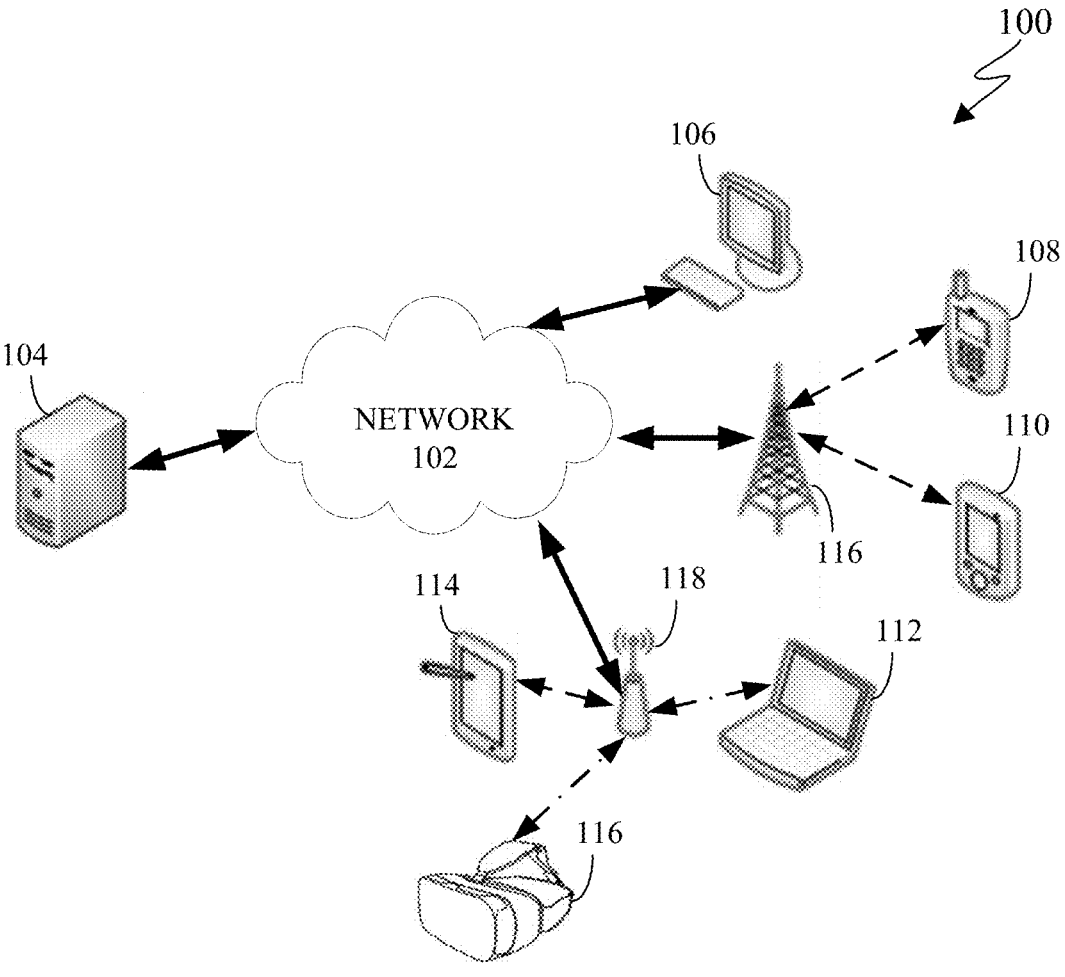
FIG. 1 illustrates an example communication system in accordance with this disclosure.

FIGS. 1 through 8, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

As noted above, three hundred sixty degree (360°) video and three dimensional (3D) volumetric video are emerging as new ways of experiencing immersive content due to the ready availability of powerful handheld devices such as smartphones. While 360° video enables an immersive "real life," "being-there," experience for consumers by capturing the 360° outside-in view of the world, 3D volumetric video can provide a complete six degrees of freedom (DoF) experience of being immersed and moving within the content. Users can interactively change their viewpoint and dynamically view any part of the captured scene or object they desire. Display and navigation sensors can track head movement of a user in real-time to determine the region of the 360° video or volumetric content that the user wants to view or interact with. Multimedia data that is 3D in nature, such as point clouds or 3D polygonal meshes, can be used in the immersive environment.

A point cloud is a set of 3D points along with attributes such as color, normal directions, reflectivity, point-size, etc. that represent an object's surface or volume. Point clouds are common in a variety of applications such as gaming, 3D maps, visualizations, medical applications, augmented reality, virtual reality, autonomous driving, multi-view replay, and six degrees of freedom (DoF) immersive media, to name a few. Point clouds, if uncompressed, generally require a large amount of bandwidth for transmission. Due to the large bitrate requirement, point clouds are often compressed prior to transmission. Compressing a 3D object such as a point cloud, often requires specialized hardware. To avoid specialized hardware to compress a 3D point cloud, a 3D point cloud can be transformed into traditional two-dimensional (2D) frames and that can be compressed and later reconstructed and viewable to a user.

Polygonal 3D meshes, especially triangular meshes, are another popular format for representing 3D objects. Meshes typically consist of a set of vertices, edges and faces that are used for representing the surface of 3D objects. Triangular meshes are simple polygonal meshes in which the faces are simple triangles covering the surface of the 3D object. Typically, there may be one or more attributes associated with the mesh. In one scenario, one or more attributes may be associated with each vertex in the mesh. For example, a texture attribute (RGB) may be associated with each vertex. In another scenario, each vertex may be associated with a pair of coordinates, (u, v). The (u, v) coordinates may point to a position in a texture map associated with the mesh. For example, the (u, v) coordinates may refer to row and column indices in the texture map, respectively. A mesh can be thought of as a point cloud with additional connectivity information.

The point cloud or meshes may be dynamic, i.e., they may vary with time. In these cases, the point cloud or mesh at a particular time instant may be referred to as a point cloud frame or a mesh frame, respectively. Since point clouds and meshes contain a large amount of data, they require compression for efficient storage and transmission. This is particularly true for dynamic point clouds and meshes, which may contain 60 frames or higher per second.

As part of an encoding process, a base mesh can be created and coded using an existing original mesh, and a reconstructed base mesh can be constructed from the coded base mesh. The reconstructed base mesh can then be subdivided into one or more subdivided meshes and a displacement field is created for each subdivided mesh. For example, if the reconstructed base mesh includes triangles covering the surface of the 3D object, the triangles are subdivided according to a number of subdivision levels, such as to create a first subdivided mesh in which each triangle of the reconstructed base mesh is subdivided into four triangles, a second subdivided mesh in which each triangle of the reconstructed base mesh is subdivided into sixteen triangles, and so on, depending on how many subdivision levels are applied. Each displacement field represents the difference between vertex positions of the original mesh and the subdivided mesh associated with the displacement field. Each displacement field is wavelet transformed to create level of detail (LOD) signals that are encoded as part of a compressed bitstream. During decoding, the displacements of each displacement field are added to their associated subdivided mesh to recreate the original mesh-frame.

Typically, when multiple levels of subdivision are applied to the reconstructed base mesh, the displacement fields are generated after all subdivisions are created from the reconstructed base mesh, and, as noted above, each displacement field represents the difference between vertex positions of the original mesh and the subdivided mesh associated with the displacement field. That is, each subdivision is created from the reconstructed base mesh, displacements are created for each subdivision level, and then all the displacements are encoded into the compressed bitstream. This disclosure provides an improved technique in which additional subdivisions are created from reconstructed subdivided meshes, and each displacement field generated for each subdivided mesh is encoded into the bitstream upon generation and decoded from the bitstream to reconstruct each subdivided mesh that is used to create the next subdivision, as described in detail herein.

FIG. 1 illustrates an example communication system 100 in accordance with this disclosure. The embodiment of the communication system 100 shown in FIG. 1 is for illustration only. Other embodiments of the communication system 100 can be used without departing from the scope of this disclosure.

As shown in FIG. 1, the communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a TV, an interactive display, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud or mesh, to one or more display devices, such as a client device 106-116. In certain embodiments, each server 104 can include an encoder. In certain embodiments, the server 104 can use hierarchical coding at the subdivision level for vertex mesh (V-mesh) to improve coding of displacements.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display 360° scenes including one or more dynamic or static 3D point clouds. In certain embodiments, any of the client devices 106-116 can include an encoder, decoder, or both. For example, the mobile device 108 can record a 3D volumetric video and then encode the video enabling the video to be transmitted to one of the client devices 106-116. In another example, the laptop computer 112 can be used to generate a 3D point cloud or mesh, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud or mesh, generate a bitstream that represents the point cloud or mesh, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud or mesh, compress a 3D point cloud or mesh, transmit a 3D point cloud or mesh, receive a 3D point cloud or mesh, decode a 3D point cloud or mesh, render a 3D point cloud or mesh, or a combination thereof. For example, the server 104 can compress a 3D point cloud or mesh to generate a bitstream and then transmit the bitstream to one or more of the client devices 106-116. As another example, one of the client devices 106-116 can compress a 3D point cloud or mesh to generate a bitstream and then transmit the bitstream to another one of the client devices 106-116 or to the server 104. In accordance with this disclosure, the server 104 and/or the client devices 106-116 can use hierarchical coding at the subdivision level for vertex mesh (V-mesh) to improve coding of displacements.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
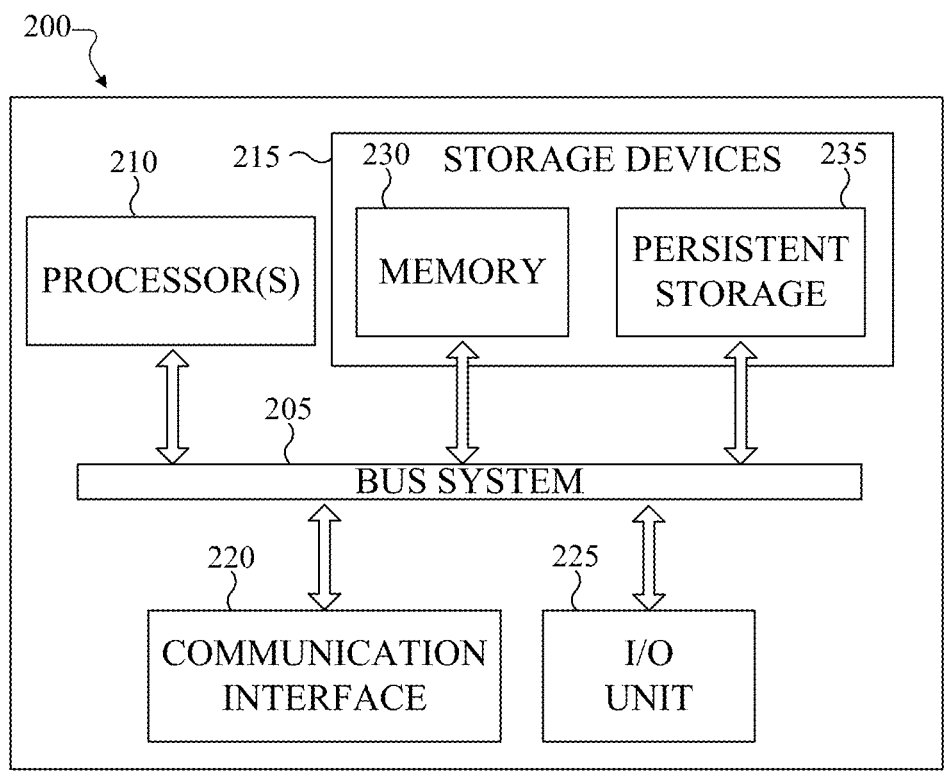
FIGS. 2 and 3 illustrate example electronic devices in accordance with this disclosure.
Figure 3:
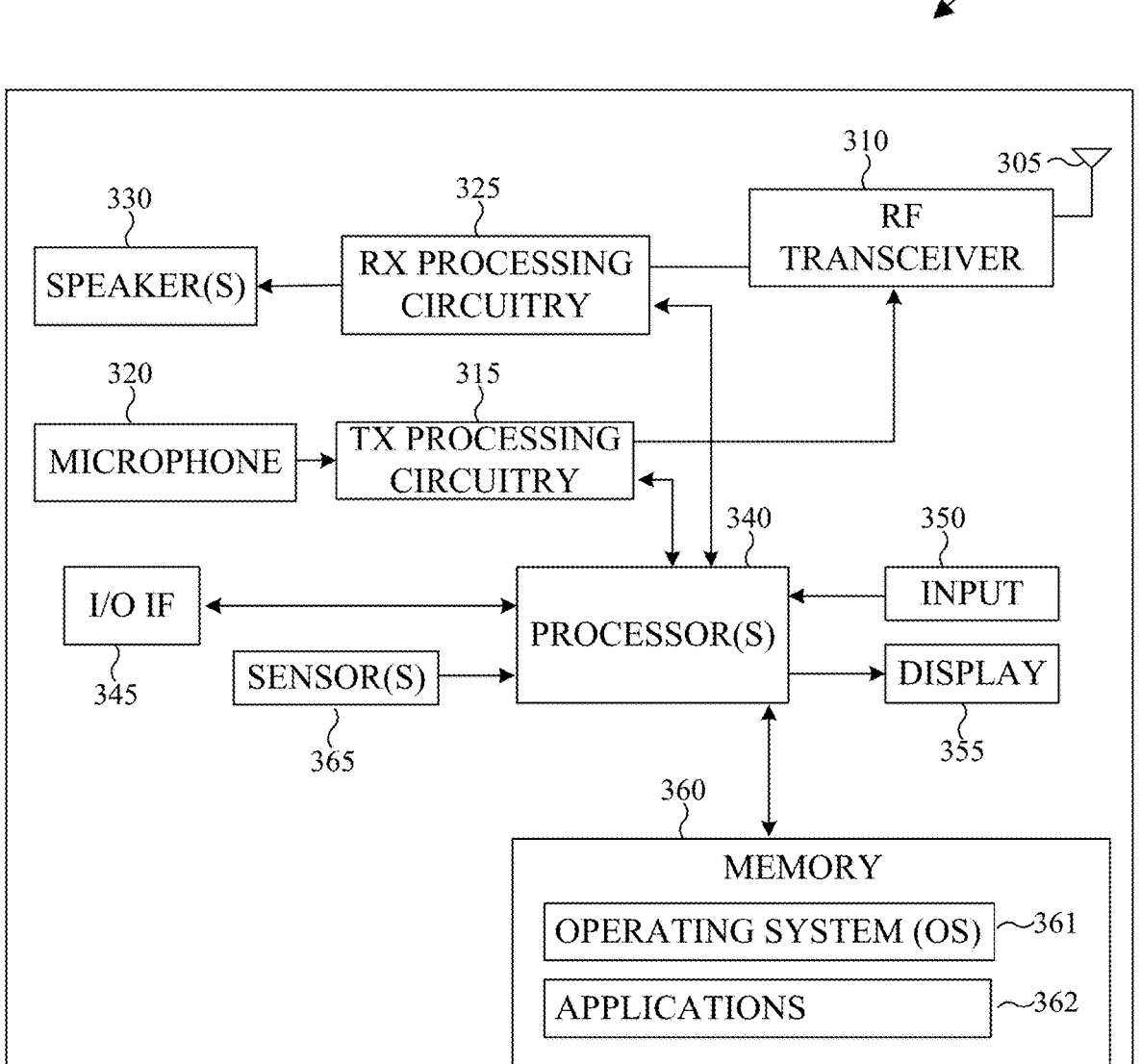

FIGS. 2 and 3 illustrate example electronic devices in accordance with this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

In certain embodiments, the processor 210 can encode a 3D point cloud or mesh stored within the storage devices 215. In certain embodiments, encoding a 3D point cloud also decodes the 3D point cloud or mesh to ensure that when the point cloud or mesh is reconstructed, the reconstructed 3D point cloud or mesh matches the 3D point cloud or mesh prior to the encoding. In certain embodiments, the processor 210 can use hierarchical coding at the subdivision level for vertex mesh (V-mesh) to improve coding of displacements.

The memory 230 and a persistent storage 235 are examples of storage devices 215 that represent any structure (s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering the point cloud on an omnidirectional 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The 3-D transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content. In certain embodiments, the processor 340 can use hierarchical coding at the subdivision level for vertex mesh (V-mesh) to improve coding of displacements.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud or mesh.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, meshes, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
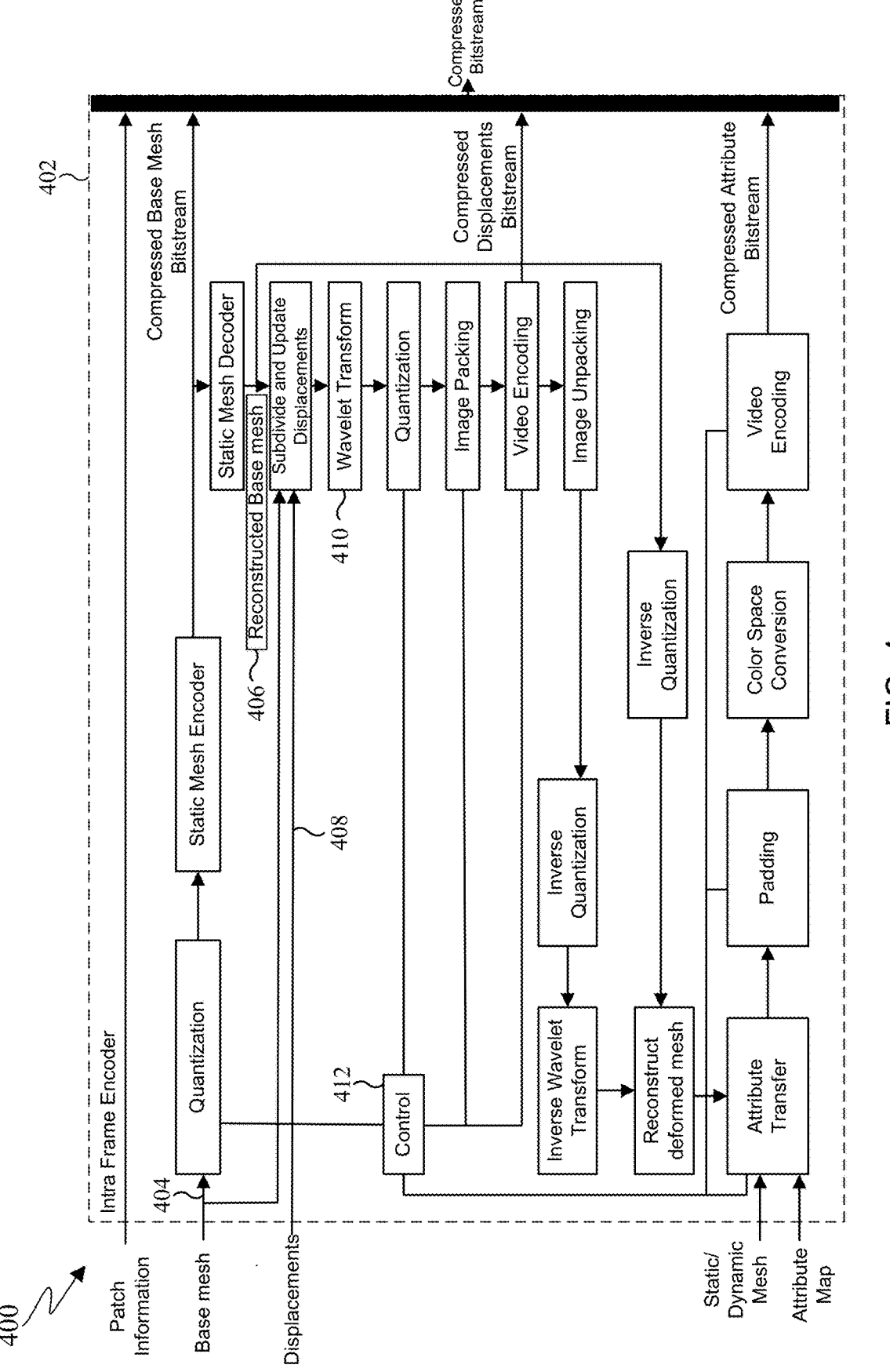
FIG. 4 illustrates an example intra-frame encoding process in accordance with this disclosure.

FIG. 4 illustrates an example intra-frame encoding process 400 in accordance with this disclosure. The intra-frame encoding process 400 illustrated in FIG. 4 is for illustration only. FIG. 4 does not limit the scope of this disclosure to any particular implementation of an intra-frame encoding process.

Various standards have been proposed with respect to vertex mesh (V-MESH) and dynamic mesh coding. The following documents are hereby incorporated by reference in their entirety as if fully set forth herein:

"V-Mesh Test Model v1," ISO/IEC SC29 WG07 N00404, July 2022.

"WD 2.0 of V-DMC", ISO/IEC SC29 WG07 N00546, January 2023.

"WD 3.0 of V-DMC", ISO/IEC SC29 WG07 N00611, April 2023.

"WD 4.0 of V-DMC," ISO/IEC JTC 1/SC 29/WG 07 N00611, August 2023.

As shown in FIG. 4, the intra-frame encoding process 400 encodes a mesh frame using an intra-frame encoder 402. The intra-frame encoder 402 can be represented by, or executed by, the server 200 shown in FIG. 2 or the electronic device

300 shown in FIG. 3. A base mesh 404, which typically has a smaller number of vertices compared to the original mesh, is created and is quantized and compressed in either a lossy or lossless manner, and then encoded as a compressed base mesh bitstream. As shown in FIG. 4, a static mesh decoder decodes and reconstructs the base mesh, providing a reconstructed base mesh 406. This reconstructed base mesh 406 then undergoes one or more levels of subdivision and a displacement field is created for each subdivision representing the difference between the original mesh and the subdivided reconstructed base mesh. In inter-coding of a mesh frame, the base mesh 404 is coded by sending vertex motions instead of compressing the base mesh directly. In either case, a displacement field 408 is created. Each displacement of the displacement field 408 has three components, denoted by x, y, and z. These may be with respect to a canonical coordinate system or a local coordinate system where x, y, and z represent the displacement in local normal, tangent, and bi-tangent directions. It will be understood that multiple levels of subdivision can be applied, such that multiple subdivided mesh frames are created and a displacement field for each subdivided mesh frame is also created.

Let the number of 3-D displacement vectors in a displacement 408 of a mesh-frame be N. Let the displacement field be denoted by $d(i)=[d_x(i), d_y(i), d_z(i)]$, $0{\le}i{<}N$. The displacement fields 408 undergo one or more levels of wavelet transformation 410 to create level of detail (LOD) signals $d^k(i)$, $i=0{\le}i{<}N^k$, $0{\le}k{<}numLOD$, where k denotes the index of the level of detail, $N^k$ denotes the number of samples in the level of detail signal at level k, and numLOD denotes the number of LODs. The LOD signals $d^k(i)$ are scalar quantized.

As shown in FIG. 4, the quantized LOD signals corresponding to the displacement fields 408 are coded into a compressed bitstream. In various embodiments, the quantized LOD signals are packed into a 2D image/video using an image packing operation, and are compressed in a lossy or lossless manner by using an image or video encoder. However, it is possible to use another entropy coder such as an asymmetric numeral systems (ANS) coder or a binary arithmetic entropy coder to code the quantized LOD signals. There may be other dependencies based on previous samples, across components, and across LODs that may be exploited.

As also shown in FIG. 4, image unpacking of the LOD signals is performed and an inverse quantization operation and an inverse wavelet transform operation are performed to reconstruct the LOD signals. Another inverse quantization operation is performed on the reconstructed base mesh 406, which is combined with the reconstructed LOD signals to reconstruct a deformed mesh. An attribute transfer operation is performed using the deformed mesh, a static/dynamic mesh, and an attribute map. A point cloud is a set of 3D points along with attributes such as color, normals, reflectivity, point-size, etc. that represent an object's surface or volume. These attributes are encoded as a compressed attribute bitstream. As shown in FIG. 4, the encoding of the compressed attribute bitstream may also include a padding operation, a color space conversion operation, and a video encoding operation. The various functions or operations shown in FIG. 4 can be controlled by a control process 412. The intra-frame encoding process 400 outputs a compressed bitstream that can, for example, be transmitted to, and decoded by, an electronic device such as the server 104 or the client devices 106-116. As shown in FIG. 4, the output compressed bitstream can include the compressed base mesh bitstream, the compressed displacements bitstream, and the compressed attribute bitstream.

Although FIG. 4 illustrates a block diagram of an example intra-frame encoding process 400, various changes may be made to FIG. 4. For example, the number and placement of various components of the intra-frame encoding process 400 can vary as needed or desired. In addition, the intra-frame encoding process 400 may be used in any other suitable process and is not limited to the specific processes described above. In certain embodiments, only the first (x) component of the displacement may be created and coded and the other two components (y and z) may be assumed to be 0. In such a case, a flag may be signaled in the bitstream to indicate that the bitstream contains only data corresponding to the first (x) component and the other two components (y and z) should be assumed to be zero when decompressing and reconstructing the displacement field 408. As another example, the intra-frame encoding process 400 of FIG. 4 can include any number of subdivision operations to create any number of subdivided mesh frames using the reconstructed base mesh 406, as described in this disclosure.

Figure 5:
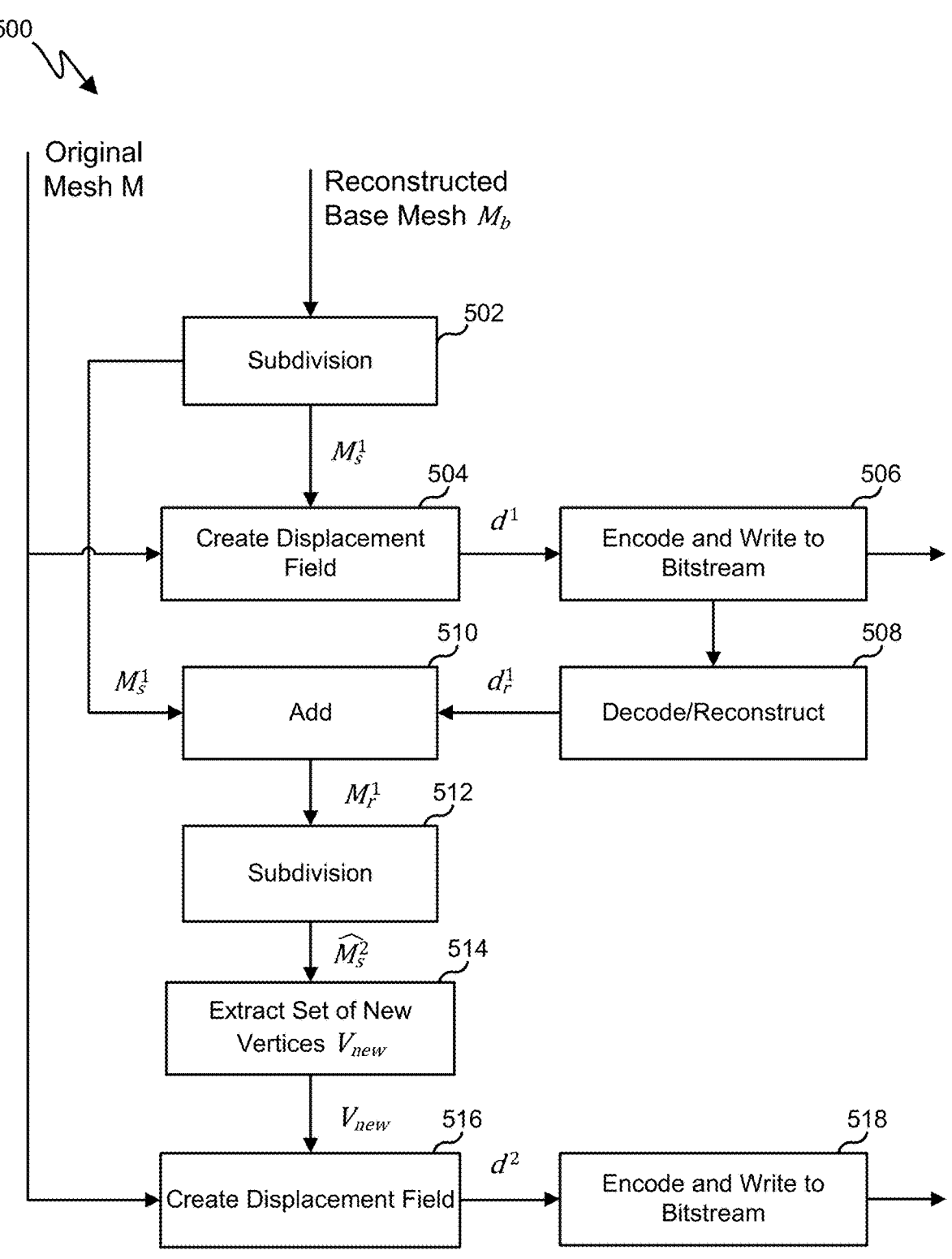
FIG. 5 illustrates an example hierarchical displacement encoding process in accordance with this disclosure.

FIG. 5 illustrates an example hierarchical displacement encoding process 500 in accordance with this disclosure. The example hierarchical displacement encoding process 500 illustrated in FIG. 5 is for illustration only. For ease of explanation, the hierarchical displacement encoding process 500 of FIG. 5 is described as being performed using the electronic device 300 of FIG. 3. However, hierarchical displacement encoding process 500 may be used with any other suitable system and any other suitable electronic device, such as the server 200.

As described in this disclosure, an encoding process can include applying multiple levels of subdivision to a reconstructed base mesh, e.g., reconstructed base mesh 406, and multiple displacement fields and corresponding LOD signals can be generated for each subdivided mesh frame created. To improve the quality of decoded meshes, this disclosure provides improved coding of displacements using hierarchical coding at the subdivision level. Rather than creating multiple subdivisions of the reconstructed base mesh, subdivisions beyond the first subdivision are created from previous subdivided mesh frames, and displacement fields are created for each of those subdivisions of the subdivided mesh frames.

For illustrative purposes, assume that two levels of subdivision are applied to the reconstructed base mesh, although it will be understood that the methods described are applicable to further levels of subdivision as well. Particularly, let the vertices in the original mesh-frame, M, be denoted as $V(i)=[v_x(i),v_y(i),v_z(i)]$, $0{\le}i{<}N$. Let the vertices in the reconstructed base mesh, $M_b$, be denoted by $$V^b(i) = \left[v_x^b(i),\, v_y^b(i),\, v_z^b(i)\right],\, 0 \le i < N^b.$$

FIG. 5 illustrates that, after applying two levels of subdivision, subdivided meshes $$M_s^1 \text{ and } M_s^2$$

are created with vertices $$V^k(i) = \left[v_x^k(i),\, v_y^k(i),\, v_z^k(i)\right],\, 0 \le i < N^k,\, k =, 1, 2.$$

Here the subscript s denotes that the meshes are obtained by subdivision. In other approaches, displacement fields are created using a subdivided mesh and the original mesh, such as by taking the difference between vertex positions of subdivided mesh $$M_s^2$$

and original mesh M, where $$M_s^2$$

is a second subdivided mesh frame created, just like a first subdivided mesh frame, from the reconstructed base mesh $M_b$. The process 500, however, creates displacement fields by taking the difference between vertex positions of subdivided meshes created using other subdivided meshes and the original mesh M. A displacement field with respect to the base mesh can also be created, which would be denoted with subscript 0.

As shown in FIG. 5, in step 502, a first subdivision of reconstructed base mesh $M_b$ is performed by the electronic device 300, creating a first subdivided mesh frame $$M_s^1.$$

After the reconstructed base mesh $M_b$ undergoes one level of subdivision to create first subdivided mesh frame $$M_s^1,$$

at step 504, a first displacement field is created by the electronic device 300 at the first level of subdivision. This can be performed by taking the difference between the projected vertex positions in $$M_s^1$$

and the nearest vertex positions in the original mesh M. However, it will be understood that other methods of generating displacements are possible. For example, a vertex from the second subdivided mesh-frame may be projected onto the nearest volumetric triangle from the original mesh. Let such a first displacement field be denoted by $$d^1(i) = \left[d_x^1(i), d_y^1(i), d_z^1(i)\right], 0 \le i < N_1.$$

Here the subscript 1 denotes that the displacement field is being formed at subdivision level 1 between $$M_s^1$$

and M. At step 506, the first displacement field, $d^1(i)$, $0 \le i < N_1$, may be quantized and coded in a bitstream by the electronic device 300, such as performing lossy quantization, for example. In some embodiments, a wavelet transform may be applied to the first displacement field before quantization, similar to that illustrated in FIG. 4.

At step 508, a first reconstructed displacement field is decoded and reconstructed by the electronic device 300 from the encoded first displacement field. Let this first reconstructed displacement field at subdivision level 1 be denoted by $$d_r^1(i), 0 \le i < N_1,$$

where r denotes reconstruction. At step 510, an intermediate mesh frame $$M_r^1$$

is formed by the electronic device 300 by adding the reconstructed displacement field $$d_r^1$$

to the first subdivided mesh frame $$M_s^1.$$

At step 512, the intermediate mesh frame $$M_r^1,$$

created from the reconstructed first displacement field $$d_r^1$$

and the first subdivided mesh frame $$M_s^1,$$

undergoes another level of subdivision by the electronic device 300 to create a second subdivided mesh frame $$\hat{M}_s^2.$$

It will be understood that the second subdivided mesh frame $$\hat{M}_s^2$$

is different from the mesh $$M_s^2$$

of other approaches, since the mesh $$M_s^2$$

of other approaches is obtained by subdividing $M_b$ twice, whereas the second subdivided mesh frame $$\hat{M}_s^2$$

is obtained by subdividing the intermediate mesh frame $$M_r^1.$$

At step 516, the electronic device 300 generates a second displacement field $d^2(i)$ at the second level of subdivision. In some embodiments, the second displacement field $d^2$ can be generated by taking the difference between the vertex positions in the second subdivided mesh frame $$\hat{M}_s^2$$

and the nearest vertex positions in the original mesh M. The process of subdividing a mesh may involve changing the positions of vertices in the subdivided mesh that correspond to vertices in the base mesh. Thus, the displacement field can be generated over all the vertices in, and extracted from, the second subdivided mesh frame $$\hat{M}_s^2.$$

In such a case, the sum of the number of samples in the displacement fields at the first and second level of subdivisions equals the number of vertices in the original mesh-frame M.

In some embodiments, the second displacement field $d^2$ can be generated by taking the difference between just new vertices in the second subdivided mesh frame $$\hat{M}_s^2$$

and the nearest vertex positions in the original mesh M. For instance, consider a set of vertices $V_{new}$ that are newly created in the second subdivided mesh frame $$\hat{M}_s^2,$$

that is, the new set of vertices do not have corresponding vertices in $$M_r^1.$$

At step 514, these new vertices $V_{new}$ can be extracted by the electronic device 300 from the second subdivided mesh frame $$\hat{M}_s^2.$$

In such embodiments, this second displacement field $d^2$ at the second level of subdivision is generated only for vertices belonging to $V_{new}$. In this case, the sum of the number of samples in the displacement fields at the first and second level of subdivisions equals the number of vertices in the original mesh-frame.

Whether the second displacement field $d^2$ is created from using all vertices in the second subdivided mesh frame $$\hat{M}_s^2,$$

or using just the new vertices, the energy in the displacement field at the second level of subdivision is lower because the vertex positions in the intermediate mesh frame $$M_r^1$$

have already been adjusted by the displacement field at the first level of subdivision. At step 518, the second displacement field, $d^2(i)$, $0 \leq i < (N-N_1)$, may be quantized and coded in the bitstream by the electronic device 300, such as performing lossy quantization, for example.

In some embodiments, during encoding, the electronic device 300 can create a video from the wavelet transform coefficients of the displacement field and then encode the video using a standards-based video codec such as High Efficiency Video Coding (HEVC), Versatile Video Coding (VVC), Alliance for Open Media Video 1 (AV1), etc. In some embodiments, a separate video is created from the wavelet transform coefficients of the displacement field at each subdivision level. Each separate video is then encoded using a standards-based video codec such as HEVC, VVC, AV1, etc. In some embodiments, a separate video can be created from the displacement field at each subdivision level without applying the wavelet transform, where each separate video is then encoded using a standards-based video codec such as HEVC, VVC, AV1. In some embodiments, a wavelet transform may be applied to $d^2(i)$ before quantization, similar to that shown illustrated in FIG. 4. In some embodiments, the wavelet transform coefficients of the displacement fields at various subdivision levels may be coded directly using any combination of context-based arithmetic coding, run-length coding, exponential Golomb coding or similar methods. In some embodiments, a transform other than wavelet transform can be used to transform the displacement fields at each subdivision level.

Although FIG. 5 illustrates a hierarchical displacement encoding process 500, various changes may be made to FIG.

17 18

5. For example, while shown as a series of steps, various steps in FIG. 5 may overlap, occur in parallel, or occur any number of times. For example, although FIG. 5 illustrates the creation of two subdivided mesh frames for illustrative purposes, any number of subdivided mesh frames can be created in the manner shown in FIG. 5.

Figure 6:
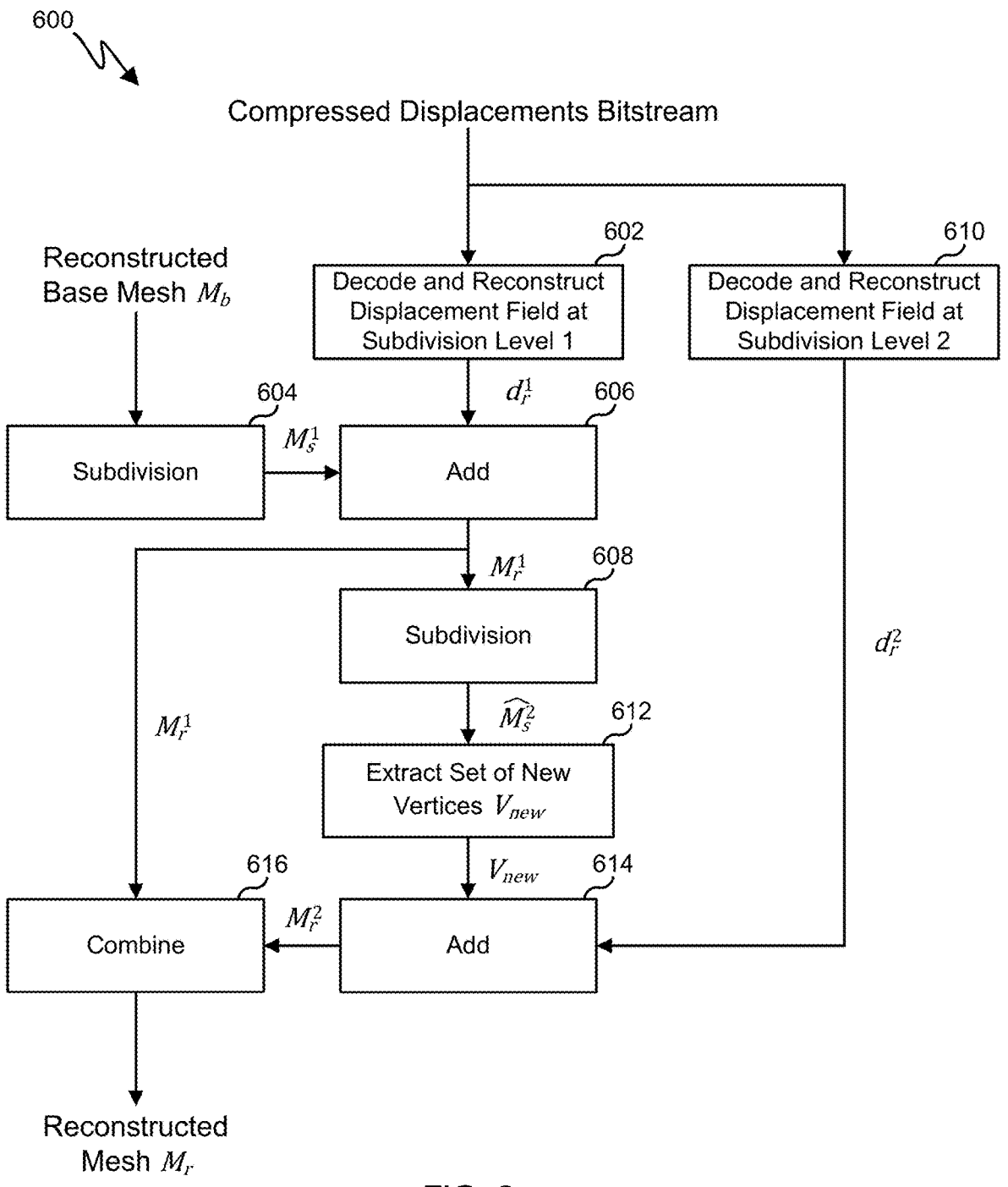
FIG. 6 illustrates an example hierarchical displacement decoding process in accordance with this disclosure.

FIG. 6 illustrates an example hierarchical displacement decoding process 600 in accordance with this disclosure. The example hierarchical displacement decoding process 600 illustrated in FIG. 6 is for illustration only. For ease of explanation, the hierarchical displacement decoding process 600 of FIG. 6 is described as being performed using the electronic device 300 of FIG. 3. However, hierarchical displacement decoding process 600 may be used with any other suitable system and any other suitable electronic device, such as the server 200.

As described in this disclosure, a compressed bitstream received by an electronic device 300 for decoding includes a compressed displacements bitstream. The decoding electronic device 300 decodes the compressed displacements bitstream from the compressed bitstream, and uses the displacements bitstream to reconstruct the original mesh. For example, at step 602 of FIG. 6, the electronic device 300 decodes and reconstructs a first reconstructed displacement field $$d_r^1$$

at the first subdivision level, corresponding to a first reconstructed displacement field $$d_r^1$$

used during encoding, such as described with respect to FIG. 5. At step 604, a first subdivided mesh frame $$M_s^1$$

is created by the electronic device 300 from the reconstructed base mesh $M_b$, where the reconstructed base mesh $M_b$ was decoded from the compressed bitstream, similar to that described with respect to FIG. 4.

At step 606, the first reconstructed displacement field $$d_r^1$$

is added by the electronic device 300 to the first subdivided mesh frame $$M_s^1$$

to create intermediate mesh frame $$M_r^1,$$

which corresponds to the intermediate mesh frame $$M_r^1$$

used during encoding, as described with respect to FIG. 5. At step 608, a second subdivided mesh frame $$\hat{M}_s^2$$

is created by the electronic device 300 from the intermediate mesh frame $$M_r^1.$$

At step 610, the electronic device 300 decodes and reconstructs a second reconstructed displacement field at the second subdivision level. Let the reconstructed displacement field at subdivision level 2 be denoted by $$d_r^2(i),\ 0 \le i < (N - N_1),$$

where r denotes reconstruction.

As also described with respect to FIG. 5, in some embodiments, the second displacement field $d^2$ can be generated by taking the difference between the vertex positions in the second subdivided mesh frame $$\hat{M}_s^2$$

and the nearest vertex positions in the original mesh M. The process of subdividing a mesh may involve changing the positions of vertices in the subdivided mesh that correspond to vertices in the base mesh. Thus, the displacement field can be generated over all the vertices in $$\hat{M}_s^2.$$

The sum of the number of samples in the displacement fields at the first and second level of subdivisions thus equals the number of vertices in the original mesh-frame M. In such cases, during decoding, at step 614, the electronic device 300 adds the second reconstructed displacement field $$d_r^2$$

to the second subdivided mesh frame $$\hat{M}_s^2$$

to create a second intermediate mesh frame $$M_r^2.$$

As also described with respect to FIG. 5, in some embodiments, the second displacement field $d^2$ can be generated by taking the difference between just new vertices $V_{new}$ in the second subdivided mesh frame $$\hat{M}_s^2$$

and the nearest vertex positions in the original mesh M. In this case, the sum of the number of samples in the displacement fields at the first and second level of subdivisions equals the number of vertices in the original mesh-frame. In such cases, at step 612, these new vertices $V_{new}$ can be extracted by the electronic device 300 from the second subdivided mesh frame $$\hat{M}_s^2.$$

Then, at step 614, the electronic device 300 adds the second decoded and reconstructed displacement field, $$d_r^2$$

to the vertex positions from the new set of vertex positions $V_{new}$.

Whether step 612 is performed or not, at step 616, a reconstructed mesh $M_r$ is formed (possibly in a lossy manner) by combining at least two sets of vertices. In the example of FIG. 6, the first set of vertices includes the vertices from the first intermediate mesh $$M_r^1,$$

and the second set of the vertices includes the vertices from the second intermediate mesh $$M_r^2.$$

The electronic device 300 then outputs the reconstructed mesh $M_r$.

Although FIG. 6 illustrates a hierarchical displacement decoding process 600, various changes may be made to FIG. 6. For example, while shown as a series of steps, various steps in FIG. 6 may overlap, occur in parallel, or occur any number of times. For example, step 610 can occur at other times during the process 600, such as concurrently with step 602, such that the electronic device 300 decodes and reconstructs all displacement fields in the compressed displacements bitstream prior to performing reconstruction of the subdivided mesh frames. As another example, although FIG. 6 illustrates the reconstruction of two subdivided mesh frames for illustrative purposes, any number of subdivided mesh frames can be reconstructed in the manner shown in FIG. 6 and combined to create reconstructed mesh $M_r$.

FIG. 7 illustrates an example encoding method 700 for improved coding of displacements using hierarchical coding at the subdivision level for V-MESH in accordance with this disclosure. For ease of explanation, the method 700 of FIG. 7 is described as being performed using the electronic device 300 of FIG. 3. However, the method 700 may be used with any other suitable system and any other suitable electronic device.

As shown in FIG. 7, at step 702, the electronic device 300 subdivides an intermediate mesh-frame, created from a reconstructed first displacement field and a first subdivided mesh-frame, to create a second subdivided mesh-frame. In various embodiments, to create the intermediate mesh-frame, the electronic device 300 decodes an encoded first displacement field to obtain the reconstructed first displacement field, and combines the reconstructed first displacement field with the first subdivided mesh-frame to generate the intermediate mesh-frame, for example as described with respect to FIG. 5. In various embodiments, the electronic device 300 can also subdivide a reconstructed base mesh-frame to create the first subdivided mesh-frame, where the reconstructed base mesh-frame is associated with an original mesh-frame, for example as described with respect to FIG. 5. As described in this disclosure, the reconstructed base mesh-frame can be created by decoding an encoding of the original mesh-frame.

In various embodiments, the electronic device 300 can also generate a first displacement field based on the first subdivided mesh-frame and the original mesh-frame, and encode the first displacement field to obtain the encoded first displacement field from which the reconstructed first displacement field is decoded and reconstructed, for example as described with respect to FIG. 5. The electronic device 300 can also write the encoded first displacement field into the bitstream.

At step 704, the electronic device 300 generates a second displacement field based on the second subdivided mesh-frame and the original mesh-frame. In various embodiments, to generate the second displacement field, the electronic device 300 can extract a set of vertex positions from the second subdivided mesh-frame and determine a difference between the extracted set of vertex positions of the second subdivided mesh-frame and a set of nearest vertex positions of the original mesh-frame, for example as described with respect to FIG. 5. In some embodiments, to generate the second displacement field, the electronic device 300 extracts a set of vertex positions of the second subdivided mesh-frame that comprise only vertex positions that differ from vertex positions in the first subdivided mesh-frame, for example as described with respect to FIG. 5. That is, the extracted set of vertex positions of the second subdivided mesh-frame comprise only new vertex positions generated by the subdivision of the intermediate mesh-frame. Alternatively, in some embodiments, the extracted set of vertex positions of the second subdivided mesh-frame can comprise all vertex positions in the second subdivided mesh-frame.

At step 706, the electronic device 300 encodes the second displacement field into a bitstream, and, at step 708, outputs the bitstream. This output bitstream can include the compressed displacement bitstream shown for example in FIG. 4, and/or can be the compressed bitstream that includes the compressed displacements bitstream, as well as the compressed base mesh bitstream, and the compressed attribute bitstream, as also shown for example in FIG. 4. The output bitstream can be transmitted to an external device or to a storage on the electronic device 300.

Although FIG. 7 illustrates one example of an encoding method 700 for improved coding of displacements using hierarchical coding at the subdivision level for V-MESH, various changes may be made to FIG. 7. For example, while shown as a series of steps, various steps in FIG. 7 may overlap, occur in parallel, or occur any number of times. As a particular example, any number of additional subdivided mesh frames and associated displacement fields can be created, and any number of displacement fields can be encoded into the bitstream, as described in this disclosure.

Figure 8:
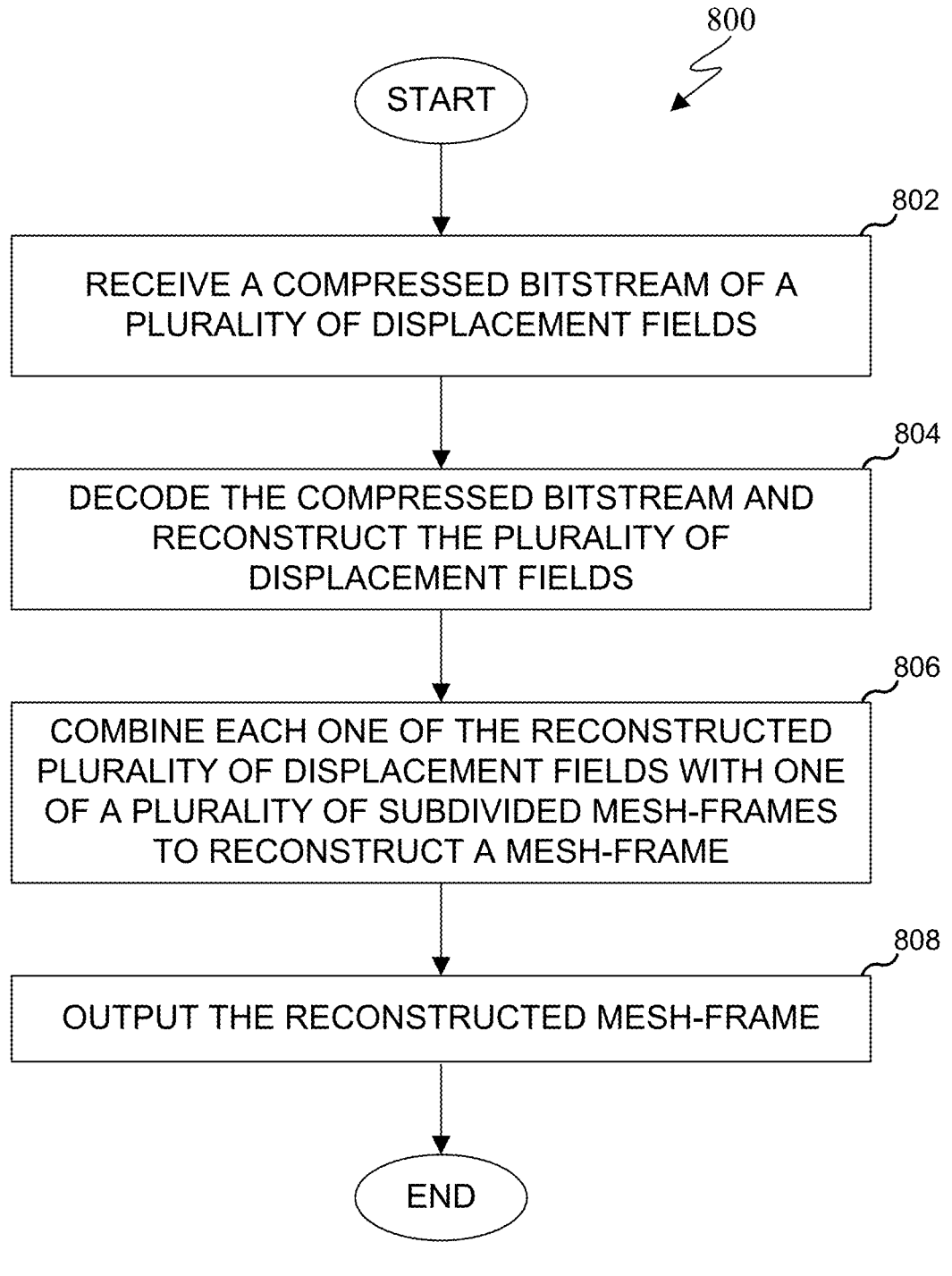
FIG. 8 illustrates an example decoding method for improved coding of displacements using hierarchical coding at the subdivision level for V-MESH in accordance with this disclosure.

FIG. 8 illustrates an example decoding method 800 for improved coding of displacements using hierarchical coding at the subdivision level for V-MESH in accordance with this disclosure. For ease of explanation, the method 800 of FIG. 8 is described as being performed using the electronic device 300 of FIG. 3. However, the method 800 may be used with any other suitable system and any other suitable electronic device.

As shown in FIG. 8, at step 802, the electronic device 300 receives a compressed bitstream including a plurality of displacement fields. At step 804, the electronic device 300 decodes the compressed bitstream and reconstructs the plurality of displacement fields from the decoded bitstream.

At step 806, the electronic device 300 combines each one of the reconstructed plurality of displacement fields with one of a plurality of subdivided mesh-frames to reconstruct a mesh-frame. As described in this disclosure, each one of the plurality of displacement fields can be associated with one of a plurality of subdivision levels, and each one of the plurality of subdivided mesh-frames can also be associated with one of the plurality of subdivision levels. In various embodiments, to combine each one of the reconstructed plurality of displacement fields with one of the plurality of subdivided mesh-frames to reconstruct the mesh-frame, the electronic device 300 can combine a reconstructed first displacement field of the reconstructed plurality of displacement fields with a first subdivided mesh-frame of the plurality of subdivided mesh-frames to create a first intermediate mesh-frame, where the first subdivided mesh-frame of the plurality of subdivided mesh frames is created from a reconstructed base mesh-frame decoded from the compressed bitstream, for example as described with respect to FIG. 6.

The electronic device 300 can also subdivide the first intermediate mesh-frame to create a second subdivided mesh-frame of the plurality of subdivided mesh-frames, and combine a reconstructed second displacement field of the reconstructed plurality of displacement fields with the second subdivided mesh-frame to create a second intermediate mesh-frame, for example as described with respect to FIG. 6. In some embodiments, at least as part of reconstructing the original mesh-frame, the electronic device 300 can combine the first intermediate mesh-frame and the second intermediate mesh-frame, for example as described with respect to FIG. 6.

In various embodiments, to combine the reconstructed second displacement field of the reconstructed plurality of displacement fields with the second subdivided mesh-frame to create the second intermediate mesh-frame, the electronic device 300 can also extract a set of vertex positions from the second subdivided mesh-frame and add the reconstructed second displacement field to the extracted set of vertex positions of the second subdivided mesh-frame, for example as described with respect to FIG. 6. In various embodiments, the extracted set of vertex positions of the second subdivided mesh-frame comprises only vertex positions that differ from vertex positions in the first subdivided mesh-frame. That is, the extracted set of vertex positions of the second subdivided mesh-frame comprise only new vertex positions generated by the subdivision of the first intermediate mesh-frame. Alternatively, in various embodiments, the extracted set of vertex positions of the second subdivided mesh-frame comprise all vertex positions in the second subdivided mesh-frame, and thus the displacement field at the second displacement level can be created for all the vertices in the second subdivided mesh frame. In such embodiments, the second reconstructed mesh-frame is the same as the final reconstructed frame.

At step 808, the electronic device 300 outputs the reconstructed mesh-frame. The output reconstructed mesh-frame can be transmitted to an external device or to a storage on the electronic device 300.

Although FIG. 8 illustrates one example of a decoding method 800 for improved coding of displacements using hierarchical coding at the subdivision level for V-MESH, various changes may be made to FIG. 8. For example, while shown as a series of steps, various steps in FIG. 8 may overlap, occur in parallel, or occur any number of times. As a particular example, any number of additional displacement fields can be decoded from the compressed bitstream and reconstructed. Additionally, any number of subdivided mesh frames can each be combined with an associated displacement field, depending on the number used during encoding, as described in this disclosure.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
a communication interface; and
a processor operably coupled to the communication interface, the processor configured to:
    subdivide an intermediate mesh-frame, created from a reconstructed first displacement field and a first subdivided mesh-frame, to create a second subdivided mesh-frame;
    extract a set of vertex positions from the second subdivided mesh-frame and generate a second displacement field based on the second subdivided mesh-frame and an original mesh-frame, wherein the extracted set of vertex positions of the second subdivided mesh-frame comprise only new vertex positions generated by the subdivision of the intermediate mesh-frame; and
    encode the second displacement field into a bitstream.

2. The apparatus of claim 1, wherein, to create the intermediate mesh-frame, the processor is further configured to:
    decode an encoded first displacement field to obtain the reconstructed first displacement field; and
    combine the reconstructed first displacement field with the first subdivided mesh-frame to create the intermediate mesh-frame.

3. The apparatus of claim 2, wherein the processor is further configured to:

subdivide a reconstructed base mesh-frame to create the first subdivided mesh-frame, wherein the reconstructed base mesh-frame is associated with the original mesh-frame;

generate a first displacement field based on the first subdivided mesh-frame and the original mesh-frame; and encode the first displacement field to obtain the encoded first displacement field and write the encoded first displacement field into the bitstream.

4. The apparatus of claim 3, wherein the reconstructed base mesh-frame is created by decoding an encoding of an original base mesh-frame.

5. The apparatus of claim 1, wherein, to generate the second displacement field, the processor is further configured to:

determine a difference between the extracted set of vertex positions of the second subdivided mesh-frame and a set of nearest vertex positions of the original mesh-frame.

6. A method comprising:

subdividing an intermediate mesh-frame, created from a reconstructed first displacement field and a first subdivided mesh-frame, to create a second subdivided mesh-frame;

extracting a set of vertex positions from the second subdivided mesh-frame and generating a second displacement field based on the second subdivided mesh-frame and an original mesh-frame, wherein the extracted set of vertex positions of the second subdivided mesh-frame comprise only new vertex positions generated by the subdivision of the intermediate mesh-frame; and encoding the second displacement field into a bitstream.

7. The method of claim 6, further comprising:

decoding an encoded first displacement field to obtain the reconstructed first displacement field; and combining the reconstructed first displacement field with the first subdivided mesh-frame to create the intermediate mesh-frame.

8. The method of claim 7, further comprising:

subdividing a reconstructed base mesh-frame to create the first subdivided mesh-frame, wherein the reconstructed base mesh-frame is associated with the original mesh-frame;

generating a first displacement field based on the first subdivided mesh-frame and the original mesh-frame; and encoding the first displacement field to obtain the encoded first displacement field and writing the encoded first displacement field into the bitstream.

9. The method of claim 8, wherein the reconstructed base mesh-frame is created by decoding an encoding of an original base mesh-frame.

10. The method of claim 6, wherein, to generate the second displacement field, the method further comprises:

determining a difference between the extracted set of vertex positions of the second subdivided mesh-frame and a set of nearest vertex positions of the original mesh-frame.

11. An apparatus comprising:

a communication interface; and a processor operably coupled to the communication interface, the processor configured to:

receive a compressed bitstream of a plurality of displacement fields;

decode the compressed bitstream and reconstruct the plurality of displacement fields; and combine each one of the reconstructed plurality of displacement fields with one of a plurality of subdivided mesh-frames to reconstruct a mesh-frame, wherein the processor is further configured to create a second subdivided mesh-frame using a first subdivided mesh-frame of the plurality of subdivided mesh-frames and extract a set of vertex positions from the second subdivided mesh-frame, wherein the extracted set of vertex positions of the second subdivided mesh-frame comprise only new vertex positions generated by a subdivision of a first intermediate mesh-frame.

12. The apparatus of claim 11, wherein:

each one of the plurality of displacement fields is associated with one of a plurality of subdivision levels; and each one of the plurality of subdivided mesh-frames is associated with one of the plurality of subdivision levels.

13. The apparatus of claim 11, wherein, to combine each one of the reconstructed plurality of displacement fields with one of the plurality of subdivided mesh-frames to reconstruct the mesh-frame, the processor is further configured to:

combine a reconstructed first displacement field of the reconstructed plurality of displacement fields with the first subdivided mesh-frame of the plurality of subdivided mesh-frames to create the first intermediate mesh-frame, wherein the first subdivided mesh-frame is created from a reconstructed base mesh-frame decoded from the compressed bitstream;

subdivide the first intermediate mesh-frame to create the second subdivided mesh-frame of the plurality of subdivided mesh-frames;

combine a reconstructed second displacement field of the reconstructed plurality of displacement fields with the second subdivided mesh-frame to create a second intermediate mesh-frame; and combine the first intermediate mesh-frame and the second intermediate mesh-frame.

14. The apparatus of claim 13, wherein, to combine the reconstructed second displacement field of the reconstructed plurality of displacement fields with the second subdivided mesh-frame to create the second intermediate mesh-frame, the processor is further configured to:

add the reconstructed second displacement field to the extracted set of vertex positions of the second subdivided mesh-frame.

\* \* \* \* \*